United States Patent
Grubb et al.

[11] Patent Number: 6,157,763
[45] Date of Patent: Dec. 5, 2000

[54] DOUBLE-CLAD OPTICAL FIBER WITH IMPROVED INNER CLADDING GEOMETRY

[75] Inventors: Stephen G. Grubb, Columbia, Md.; David F. Welch, Menlo Park, Calif.

[73] Assignee: SDL, Inc., San JOse, Calif.

[21] Appl. No.: 09/050,386

[22] Filed: Mar. 30, 1998

Related U.S. Application Data

[60] Provisional application No. 60/072,820, Jan. 28, 1998.

[51] Int. Cl.[7] .................................................. G02B 6/22
[52] U.S. Cl. ................................. 385/126; 385/127; 372/6
[58] Field of Search ................................. 385/126, 127, 385/146, 147; 372/6

[56] References Cited

U.S. PATENT DOCUMENTS

| | | | |
|---|---|---|---|
| 5,473,622 | 12/1995 | Grubb | 372/6 |
| 5,533,163 | 7/1996 | Muendel | 385/126 |
| 5,864,645 | 1/1999 | Zellmer et al. | |
| 5,949,941 | 9/1999 | DiGivanni | 385/127 |

*Primary Examiner*—Hung N. Ngo
*Attorney, Agent, or Firm*—Kudirka & Jobse, LLP

[57] ABSTRACT

A double-clad optical fiber has an inner cladding with a cross-sectional shape that is non-circular, but that maintains a good end-coupling profile. The cross-sectional shape of the inner cladding is such that two perpendicular distances across the shape, each of which passes through a geometric center of a core of the fiber, are equal for all angular positions. Thus, while mode mixing within the inner cladding is enhanced, the inner cladding does not suffer any oblong distortions of its shape, and is therefore more easily coupled to conventional fibers. The cross-sectional cladding shape may include various regions along its outer surface that do not conform to a circular geometry about a center of the core. These regions may include flat regions, or concave or convex regions. The overall cross-sectional shape of the inner cladding may also be octagonal or star-shaped. In an alternative embodiment of the invention, the inner cladding may have a circular cross section, but has a torsional stress induced within it during manufacture. By rotating the fiber preform prior to curing of the inner cladding layer, a physical stress may be permanently imparted to the inner cladding which interacts with pump energy within the inner cladding layer to encourage mode mixing.

22 Claims, 5 Drawing Sheets

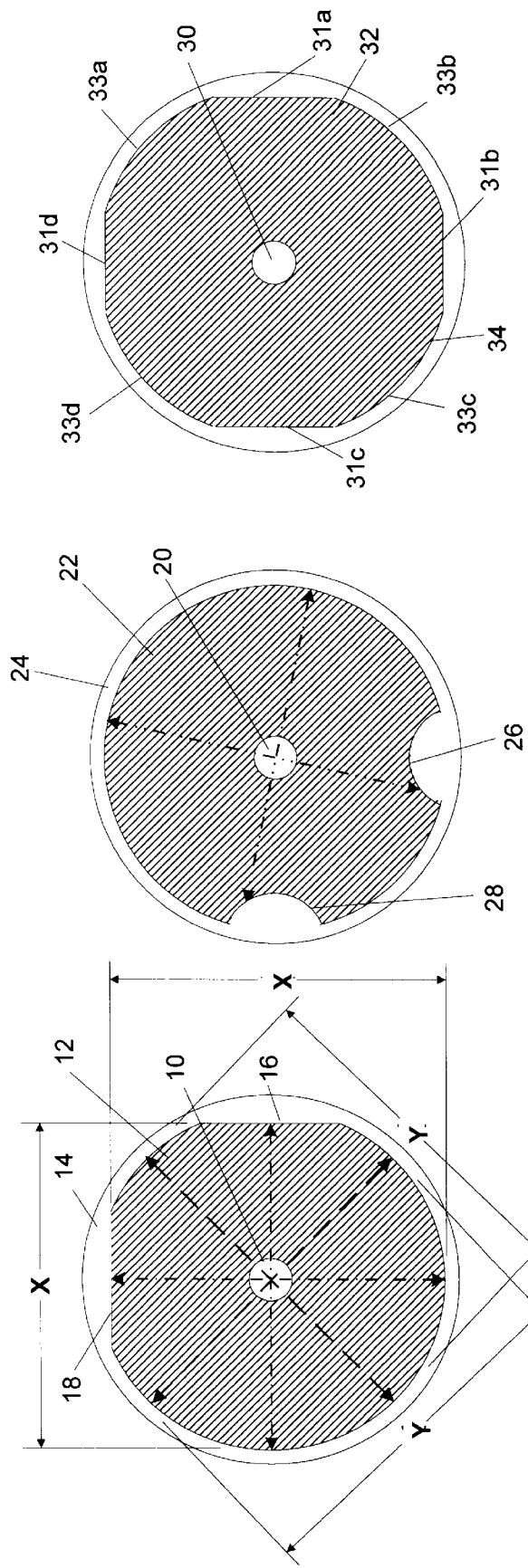

DOUBLE-CLAD OPTICAL FIBER WITH IMPROVED INNER CLADDING GEOMETRY

CROSS REFERENCE TO RELATED APPLICATIONS

This application claims the benefit of U.S. provisional application Ser. No. 60/072,820, filed Jan. 28, 1998.

FIELD OF THE INVENTION

This invention relates to optical fibers and, more specifically, to double-clad optical fibers, particularly as they are used in cladding-pumped optical amplifiers and lasers.

DESCRIPTION OF THE RELATED ART

An optical amplifier is a device that increases the amplitude of an input optical signal fed thereto. If the optical signal at the input to such an amplifier is monochromatic, the output will also be monochromatic, with the same frequency. A conventional fiber amplifier comprises a gain medium, such as a glass fiber core doped with an active material, into which is coupled to an input signal. Excitation occurs from the absorption of optical pumping energy by the core. The optical pumping energy is within the absorption band of the active material in the core, and when the optical signal propagates through the core, the absorbed pump energy causes amplification of the signal transmitted through the fiber core by stimulated emission. Optical amplifiers are typically used in a variety of applications including but not limited to amplification of weak optical pulses such as those that have traveled through a long length of optical fiber in communication systems.

One typical example of a fiber amplifier is referred to as an erbium (Er) amplifier, and includes a silica fiber having a single-mode core doped with erbium (specifically doped with erbium ions conventionally denoted as $Er^{3+}$). It is well known that an erbium optical fiber amplifier operating in its standard so-called three level mode is capable, when pumped at a wavelength of 980 nanometers (nm), of amplifying optical signals having a wavelength of 1550 nm. Since 1550 nm is the lowest loss wavelength of conventional single-mode silica glass fibers, erbium amplifiers are well suited for inclusion in fiber systems that propagate signals having wavelengths around 1550 nm.

In certain applications, particularly high-power ones, it may be desirable to provide optical amplification using a double-clad fiber. A typical double-clad fiber has an inner core, through which an optical signal is transmitted, an inner cladding surrounding the core that is of lower refractive index than the core, and an outer cladding surrounding the inner cladding that has a lower refractive index than the inner cladding. When using a double-clad fiber for optical amplification, it is known that the optical pumping energy need not be coupled directly into the core, where it will be absorbed for amplification purposes, but may be coupled into the inner cladding, where it propagates in various reflective trajectories through the cladding until it intersects the core. Once contacting the core, pump energy is absorbed and provides stored energy in the core for stimulated emission amplification of the optical signal.

One well-known problem with the use of double-clad fibers for optical amplifiers is the fact that among the transmission modes of the pumping energy through the inner cladding are a number which never intersect the core. Because a conventional double-clad fiber has a cylindrical core surrounded by an annular inner cladding, it is possible for a number of helical modes to exist within the inner cladding which travel through the inner cladding without ever intersecting the core. Since these modes never intersect the core, the pump energy is not absorbed and does not contribute to the amplification of the optical signal. This has led to attempts to reduce the helical spatial modes within the inner cladding of a double-clad fiber.

One way of reducing the problem with modes that do not intersect the core is to promote "mode mixing." By changing the shape of the inner cladding, the number of reflective helical modes within the inner cladding can be minimized. In short, the introduction of different surface variations into the cross-sectional shape of the inner cladding results in reflective patterns through the cladding that must relatively quickly intersect the core. Such a design is shown in U.S. Pat. No. 4,815,079 to Snitzer et al. In FIG. 2 of the Snitzer et al. patent, a cross-sectional view of a fiber shows an inner cladding 210 with a rectangular shape. This cladding relies on a difference in its width and height to provide the desired mode mixing within. However, its oblong shape is difficult to produce, and limits the end coupling into the fiber.

Another prior art cladding design is shown in International Patent Application WO 97/12429 to Zellmer et al. FIG. 2 of this application depicts the problem with helical modes in a double-clad fiber having a conventional inner cladding. Zellmer et al. address the problem of these helical modes by attempting to promote mode mixing by introducing a flat section into the otherwise circular cross section of the inner cladding outer surface. This inner cladding shape is shown in FIG. 3 of the application. This approach does appear to improve mode mixing over the traditional fiber shape, and is relatively simple to produce compared to a rectangular construction. Since only one flat surface has to be formed, only a single region of a fiber preform must be removed from the inner cladding of a fiber with a circular cross section, a structure that is relatively easy to make. In the description of the application, the length of the flat region is described as being 1% to 49% of the diameter of the inner cladding.

The prior art described above is directed toward mode mixing to increase the coupling of pumping energy from the inner cladding into the core. However, while the methods described do enhance mode mixing, they do so by significantly distorting the shape of the inner cladding. Thus, the end coupling profile of the inner cladding is significantly altered relative to a typical double-clad fiber with a circular inner cladding cross section. This reduces the capacity for coupling pump energy into or out of the altered fiber shape.

SUMMARY OF THE INVENTION

The present invention provides a double-clad optical fiber having an inner cladding with a cross-sectional shape that not only induces mode mixing, but also preserves a profile that is equal in perpendicular dimensions. That is, the inner cladding has a cross-sectional shape such that two perpendicular distances across the shape, each of which passes through a geometric center of the core, are equal for all angular positions. Thus, the inner cladding is not oblong in any particular dimension and, no particular cross-sectional dimension of the inner cladding has a preference for coupling capacity.

The fiber includes a core through which an optical signal propagates. The core is surrounded by the inner cladding, which has a lower index of refraction than the core. The inner cladding is, in turn, surrounded by an outer cladding that has an index of refraction lower than the inner cladding.

Herein, reference to the "cross-sectional shape" of the inner cladding refers to the shape of its outer surface in a plane perpendicular to a longitudinal direction in which optical signal energy propagates through the core of the fiber.

In a first embodiment of the invention, the cross-sectional shape of the inner cladding includes two flat surfaces, a first of which is colinear with a first line and a second of which is colinear with a second line that is perpendicular to the first line. Thus, the two flat surfaces are perpendicular to each other, and are located, relative to a geometric center of the core in the cross-sectional plane, at an angle of 90° relative to each other. In a variation of this embodiment, the cross-sectional shape has four flat surfaces separated by other surfaces of the shape, wherein two of the four flat surfaces are parallel to a first line and two are parallel to a second line, the first and second lines preferably being perpendicular to each other. In still another variation of the primary embodiment, a cross-sectional shape of the inner cladding of the fiber is octagonal.

The fiber of the embodiment described above may be used in a fiber amplifier in which a first optical signal in a first wavelength band travels through a core of the fiber in a longitudinal direction. The core is doped with an active element such that it absorbs light in a second wavelength band and outputs light in the first wavelength band in response to the first optical signal propagating through the core. An optical pumping source is used to generate an optical pumping signal in the second wavelength band that is coupled into the inner cladding of the fiber. The pumping signal may be coupled into an end of the fiber, taking advantage of the profile of the inner cladding, or may be side coupled into a flat region along the outer surface of the inner cladding.

In an alternative embodiment of the invention, a double-clad optical fiber has a core through which optical energy travels in a longitudinal direction, surrounded by an inner cladding which, in turn, is surrounded by an outer cladding. In this embodiment, the cross-sectional shape of the inner cladding may be circular. However, the inner cladding has a torsional stress induced by rotation of the fiber during manufacture about the longitudinal axis of the fiber. Preferably, after applying the inner cladding layer to the core, and prior to curing it in an oven, a rotation is imparted to the fiber which causes the torsional stress in the inner cladding material. When the fiber is thereafter cured, the torsional stress becomes permanently fixed in the inner cladding layer. This stress disrupts the helical modes within the inner cladding, and increases the level of mode mixing.

BRIEF DESCRIPTION OF THE DRAWINGS

FIG. 1 is a cross-sectional schematic view of an optical fiber according to the present invention in which an inner cladding has a cross-sectional shape with two flat surfaces oriented at a right angle to each other.

FIG. 2 is a cross-sectional schematic view of an optical fiber that demonstrates one of numerous inner cladding constructions that satisfies the constraints of a first embodiment of the present invention.

FIG. 3 is a cross-sectional schematic view of an optical fiber according to the present invention in which an inner cladding has a cross-sectional shape with four flat surfaces, each oriented at a different rotational increment of 90 degrees.

DETAILED DESCRIPTION OF THE PREFERRED EMBODIMENTS

Figure 6:
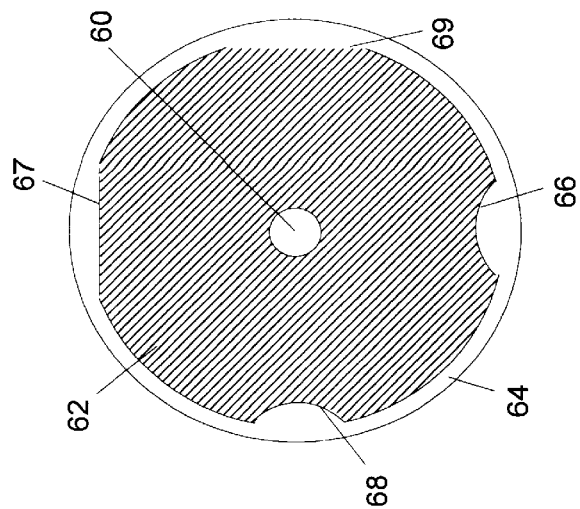
FIG. 6 is a cross-sectional schematic view of an optical fiber according to the present invention in which an inner cladding has a cross-sectional shape with two concave portions and two flat portions.

Shown in FIG. 1 is a schematic cross-sectional view of a double-clad optical fiber having a particular inner cladding geometry. The fiber consists of a core 10 which may be doped with an active element such as erbium (Er), ytterbium (Yb) or neodymium (Nd), or co-doped with such rare earth materials (e.g., Er/Yb). The core functions as a transmission medium for optical signals which propagate in a longitudinal direction along the length of the fiber. The core may be any material typically used in optical fibers (such as silica glass), and has a first refractive index. Surrounding the core 10 is an inner cladding layer 12 which has a second refractive index, typically lower than that of the core. Some typical materials from which inner cladding 12 may be made include silica glass, fluoride glass or ZBLAN. The inner cladding layer 12 is surrounded by an outer cladding layer 14, which has a lower index of refraction than the inner cladding. Outer cladding 14 may be comprised of a polymer material, as is known in the art.

The fiber construction of FIG. 1 may be used as part of an optical amplifier that amplifies an optical signal propagating through the core 10. The inner cladding layer 12, being separate from the core, allows optical pumping energy to be coupled into the fiber without having to couple it into the core 12 of the fiber itself. The optical pumping energy undergoes internal reflection within the inner cladding, some of the reflection resulting in pumping energy crossing into the core 10. The core, which is doped in a known way with an active element, is absorbent at the wavelength of the pumping energy. For example, the core may be doped with erbium ions, making it absorbent at a wavelength band centered about approximately 980 nm. As the pumping energy is absorbed, optical signal energy is added to the optical signal propagating through the core (which may have a wavelength of, e.g., 1550 nm) by stimulated emission of the energy stored in the doped fiber core. Thus, the optical signal in the core 10 is amplified from pumping of the inner cladding 12.

The embodiment of FIG. 1, like other embodiments of the present invention, has a particular cross-sectional inner cladding geometry that both promotes mode mixing within the inner cladding layer 12, and maintains a shape that is particularly suitable for coupling light into or out of the inner cladding. This coupling aspect of the fiber is preserved by ensuring that the cross-sectional cladding shape adheres to the limitation that, for all angular positions, perpendicular dimensions (or orthogonal diametrical lengths) passing through the center of the core are equal. That is, the shape maintains a degree of circularity in not being oblong in any given plane of rotation. Since coupling is typically to a fiber with circular cladding, this ensures that coupling efficiency is not only preserved relative to the overall cross-sectional shape of the inner cladding, but that it is substantially equal in any two perpendicular dimensions that cross through the center of the core. Two sets of such dimensions are shown as dashed lines in FIG. 1, and their equal length is depicted by the dimension lines showing each as having the length "X" and the length "Y".

The shape of FIG. 1 is one of the preferred embodiments in that the flat surfaces 16, 18 are at right angles to each other along the outside boundary 19 of the shape, and may be created by abrading away the surface of a cylindrical inner cladding of a glass preform of the fiber (i.e. one with a circular cross section). However, it will be understood that the cross-sectional shape of the inner cladding may have any of a limitless number of other shapes, each of which will satisfy the requirement that perpendicular dimensions of the inner cladding through the core center are equal for any angular position thereof. For example, in the embodiment of FIG. 2, inner cladding 22 surrounds core 20, and is surrounded by outer cladding 24. The inner cladding 22 has a cross section that is roughly circular, but which has two indentations 26, 28 of equal shape. With reference to a geometric center of the core 20, these indentations are positioned along the outer edge of the inner cladding at an angle of 90° relative to each other. Thus, for any rotational position relative to this center point, two perpendicular dimensions across the inner cladding that pass through the core center will be equal in length. The orthogonal set of dashed lines in FIG. 2 demonstrate the equal perpendicular dimensions at an arbitrary angular position.

Shown in FIG. 3 is another preferred embodiment of the invention in which four flat regions 31a–31d exist along the edge of an otherwise circular cross section of inner cladding 32. The inner cladding 32 surrounds a core 30, and is shown with an outer cladding layer 34 formed on the inner cladding 32. Relative to a geometric center of the core 30, the flat regions 31a–31d are positioned at relative increments of 90°. These flats on the outer boundary of inner cladding 32 separate remaining semicircular boundary portions 33a–33d. Since the flat regions are the same size, it can be seen that for any set of perpendicular dimensions passing through the geometric center of the core 30, the dimensions will be equal.

The flat regions 31a–31d along the outer edge of the inner cladding 32 provide a high degree of mode mixing within the confines of the cladding so that more of the light will have an opportunity to cross through central core 30 than if the core had a circular cross section. However, this embodiment is also particularly well-suited for coupling pump energy into and out of the inner cladding, either at the end or along the side of the cladding 32. For end coupling, it retains a substantially circular profile, helping to maximize coupling to a fiber with an inner cladding having a circular cross section. For side coupling, the flat regions of the inner cladding provide a good flat interface through which pump signals may be injected into the inner cladding 32. Such side coupling techniques are know in the art, and their use in conjunction with the present invention would be in a known manner.

Figure 5:
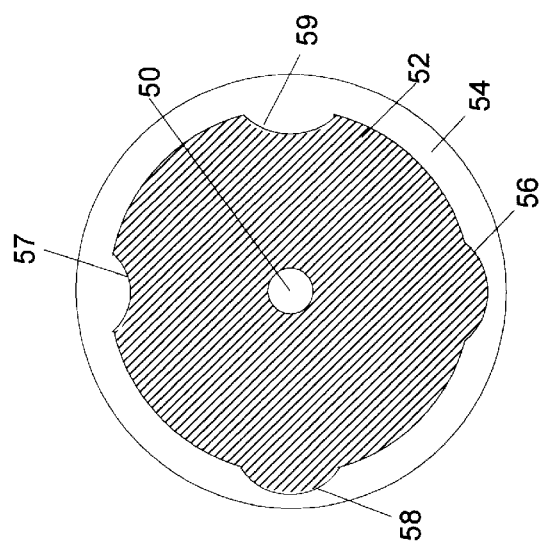
FIG. 5 is a cross-sectional schematic view of an optical fiber according to the present invention in which an inner cladding has a cross-sectional shape with two convex portions and two concave portions.
Figure 4:
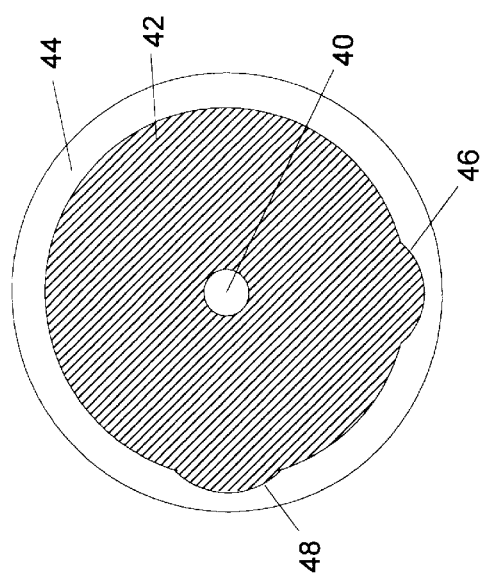
FIG. 4 is a cross-sectional schematic view of an optical fiber according to the present invention in which an inner cladding has a cross-sectional shape with two convex portions.

Some additional examples of non-circular cladding cross-sectional structures according to the present invention are shown in FIGS. 4–6. Each of these shapes meets the restriction that any set of perpendicular dimensions of the inner cladding that pass substantially through the center of the core are equal. Thus, each of the shapes provides the desired mode mixing and preservation of good circular coupling, but each has different shape components that make it unique.

In FIG. 4, the cross section of the fiber has a core 40 surrounded by a somewhat circular inner cladding 42, which is in turn surrounded by outer cladding 44. The shape of the inner cladding 42 includes some convex sections 46, 48 extending beyond the otherwise circular cross-sectional outer surface. These convex sections, being equal in shape and at a 90° relative angular position, provide an inner cladding cross-sectional shape that satisfies the criteria of the present invention.

FIG. 5 depicts a core 50 surrounded by an inner cladding 52, which is, in turn, surrounded by outer cladding 54. Like the embodiment of FIG. 4, the FIG. 5 inner cladding cross-sectional shape includes convex regions 56, 58 protruding from the otherwise circular cross-sectional surface of the shape. However, like the embodiment of FIG. 2, the embodiment of FIG. 5 also includes concave regions 57, 59, each positioned opposite one of the convex regions. It can be seen that, for all different rotational positions, any two diameters of the shape that pass through the center of the core 50 will be equal in length. Thus, despite the good mode mixing reflections provided by the shapes 56, 57, 58, 59, the fiber will retain a good coupling profile for coupling to a standard multimode or standard double-clad optical fiber respectively having a core or an inner cladding with a circular cross section.

FIG. 6 depicts the cross section of a fiber that has an inner cladding that is a combination of the shape shown in FIG. 2 and that of FIG. 3. As shown, inner cladding 62, surrounding core 60 and surrounded by outer cladding 64, has two concave sections 66, 68 and two flat regions 67, 69 along its otherwise circular edge. While the concave shape and the flat shape are unrelated to each other, their positioning in the cross-sectional plane of the inner cladding preserves the desired characteristics. In particular, with regard to the center of core 60, the concave section 66 is equal in size and orientation to, and at a 90° angular position relative to, concave section 68. Likewise, flat region 67 is equal in size and orientation to, and at a 90° angular position relative to, flat region 69. Thus, for any angular position, perpendicular dimensions passing through the center of the core will be equal in length.

Figure 7:
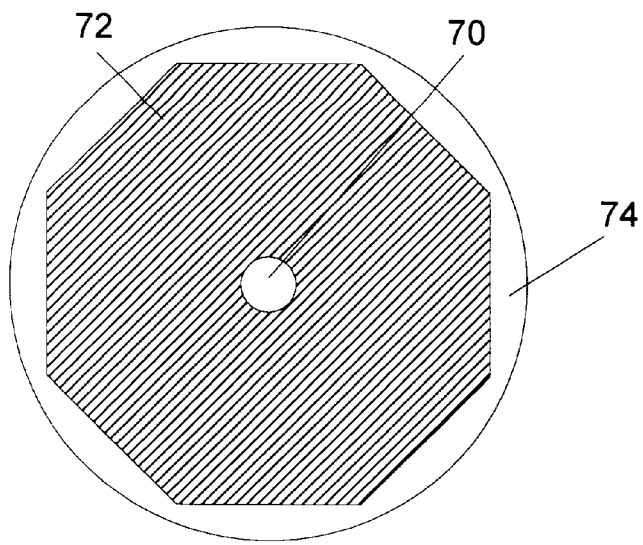
FIG. 7 is a cross-sectional schematic view of an optical fiber according to the present invention in which an inner cladding has an octagonal cross-sectional shape.

FIG. 7 is another embodiment according to the present invention. This embodiment has a core 70 which is surrounded by inner cladding 72 which is, in turn, surrounded by outer cladding 74. The cross-sectional shape of the inner cladding 72 is octagonal. One of the preferred features of this fiber construction is the fact that the inner cladding 72 closely approximates a circle, giving it good coupling characteristics, but retains flat regions along its outer edge that provide the desired mode mixing, as well as good surfaces by which to use side coupling techniques to inject pump energy into the inner cladding 72. Naturally, this shape satisfies the criterion that, for any pair of perpendicular dimensions passing through the center of the core 70, the length of the two dimensions is equal. Those skilled in the art will recognize that polygons of different orders having sets of parallel flat surfaces of equal size opposite each other will also satisfy this criterion, and are considered to be within the scope of the invention.

Figure 8:
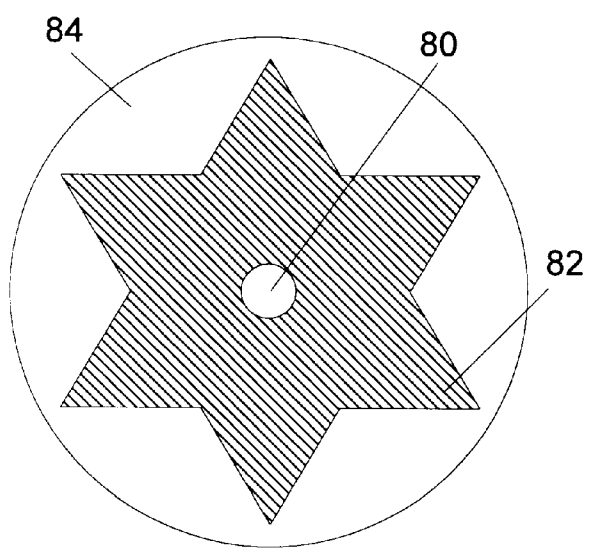
FIG. 8 is a cross-sectional schematic view of an optical fiber according to the present invention in which an inner cladding has a cross-section that is star-shaped.

FIG. 8 shows a cross-sectional schematic view of a double-clad fiber with core 80 surrounded by inner cladding 82 which, in turn, is surrounded by outer cladding 84. The inner cladding 82 has a cross-sectional shape which is that of a six-pointed star. This shape, like the octagonal shape of the FIG. 7 embodiment, has no curved surfaces to its inner cladding cross section. However, is does provide the equal perpendicular dimension criterion described above, which helps to maximize its coupling efficiency.

Figure 9:
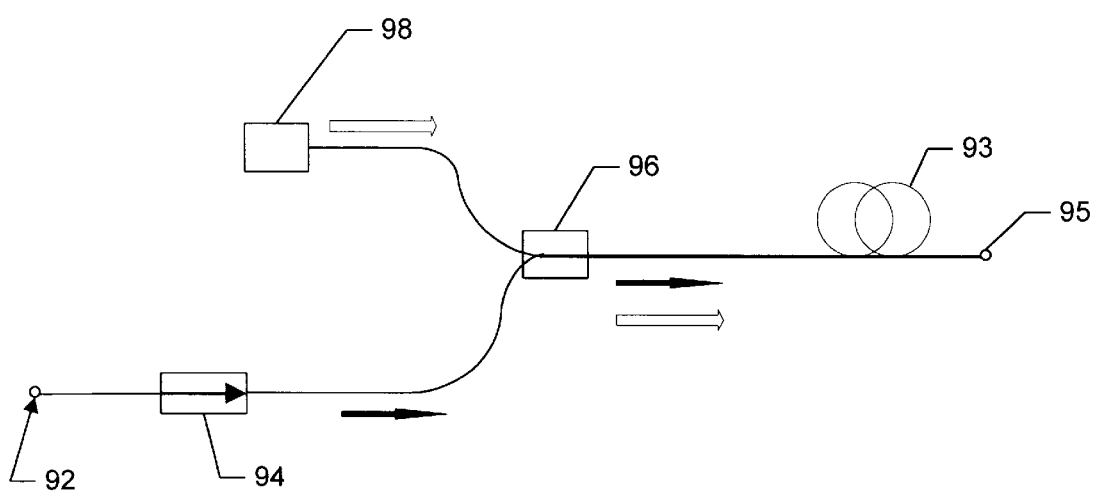
FIG. 9 is a schematic view of an optical amplifier according to the present invention.

A general amplifier arrangement is shown in FIG. 9 which is appropriate for amplifier embodiments using the double-clad fibers of the present invention. The double-clad fiber 93 receives an optical signal (indicated in the figure by a solid black arrow) that originates at signal input port 92. The optical signal is preferably passed through an optical isolator 94 to prevent signal reflections from returning to the signal source. The signal is coupled into the core of the fiber at coupler 96, which is an optical coupler of known design. The optical coupler 96 is also used to couple optical pumping energy from optical pumping source 98 into the inner cladding of the fiber 92. Optical pumping source 98 is an optical source of known design, such as a laser diode, which has the desired output wavelength. The path of the optical pumping energy is depicted in the figure by the outlined (i.e. "white"). As the optical signal propagates through the core of the double-clad fiber 93, the optical pumping energy travels through the inner cladding, spatial mode mixing being encouraged by the particular construction of the fiber inner cladding. The core is doped with an active element and, as the pumping energy interacts with the core, it is absorbed and reradiated in the core, amplifying the optical signal propagating within. The amplified optical signal is then output at output port 95, where it is used in any desired application.

Figure 10:
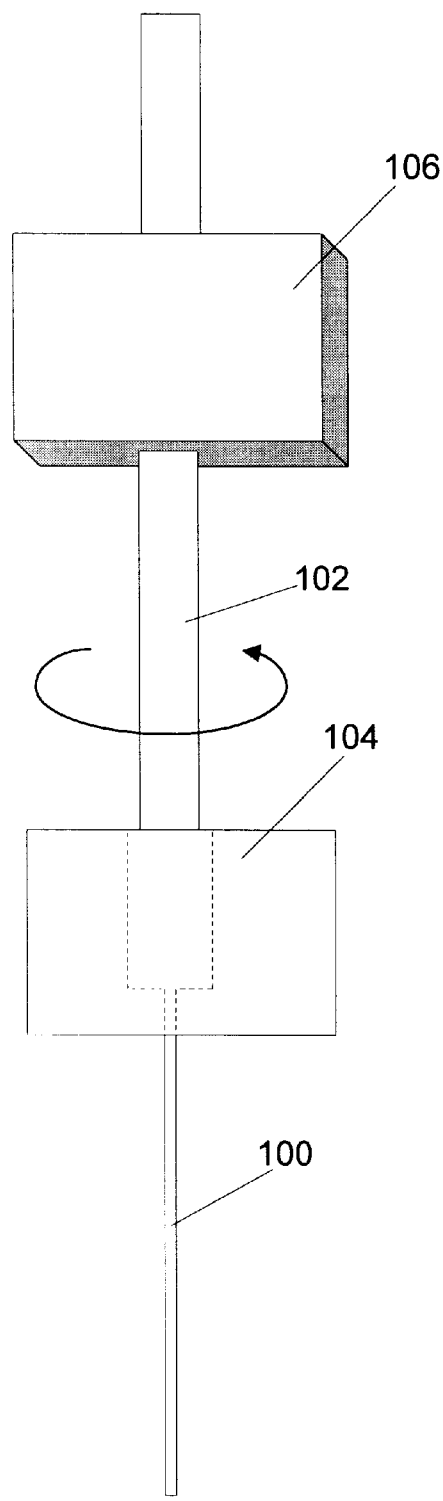
FIG. 10 is a schematic view of an optical fiber manufacturing process in which a fiber preform is rotated while it is drawn.

FIG. 10 shows an alternative embodiment of the invention in which a double-clad fiber having an inner cladding with a conventional circular cross-sectional shape is drawn in such a way that physical stresses are integrated into the inner cladding material during manufacture. As shown in the figure, the fiber preform, with inner cladding layer 102 on the outside, is heated in heater 106 to bring it to a molten state. The heater 106 also contains a motor that rotates the fiber as it is being drawn through a cup 104. The rotation creates a torsional stress within the inner cladding that is retained in the drawn fiber 100 after it cools. This physical stress disturbs the normal helical modes which, in a conventional double-clad fiber having an inner core with a circular cross section, could propagate through the cladding without intersecting the core. As these modes are disturbed by the stresses in the fiber, they are redirected so that the light in them intersects the core. Thus, the desired mode mixing is achieved.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. An optical fiber comprising:
   a core through which optical energy travels in a longitudinal direction, the core having a first refractive index;
   an inner cladding surrounding the core and having a second refractive index lower than the first refractive index, the inner cladding having a noncircular cross-sectional shape in a plane perpendicular to the longitudinal direction which is shaped such that two perpendicular distances across the shape, each of which passes through a geometric center of the core, are equal for all angular positions; and
   an outer cladding surrounding the inner cladding.

2. A fiber according to claim 1 wherein the cross-sectional shape has two flat surfaces, a first of which is colinear with a first line and a second of which is colinear with a second line that is perpendicular to the first line.

3. A fiber according to claim 2 wherein the cross-sectional shape has four flat surfaces separated by other surfaces of the shape, and wherein two of the four flat surfaces are parallel to a first line and two are parallel to a second line.

4. A fiber according to claim 3 wherein the first line and the second line are perpendicular to each other.

5. A fiber according to claim 1 wherein the cross-sectional shape is octagonal.

6. An optical amplifier for amplifying a first optical signal having a first wavelength, the amplifier comprising:
   an optical fiber comprising:
      a core through which the first optical signal travels in a longitudinal direction, the core having a first refractive index and being doped with an active element such that it absorbs light in a second wavelength band and outputs light in the first wavelength band in response thereto;
      an inner cladding surrounding the core and having a second refractive index lower than the first refractive index, the inner cladding having a noncircular cross-sectional shape in a plane perpendicular to the longitudinal direction which is shaped such that two perpendicular distances across the shape, each of which passes through a geometric center of the core, are equal for all angular positions; and
      an outer cladding surrounding the inner cladding; and
   an optical pumping source generating an optical pumping signal in the second wavelength band that is coupled into the inner cladding of the fiber.

7. An optical amplifier according to claim 6 wherein the cross-sectional shape has two flat surfaces, a first of which is colinear with a first line and a second of which is colinear with a second line that is perpendicular to the first line.

8. An optical amplifier according to claim 7 wherein the cross-sectional shape has four flat surfaces separated by other surfaces of the shape, and wherein two of the four flat surfaces are parallel to a first line and two are parallel to a second line.

9. An optical amplifier according to claim 8 wherein the first line and the second line are perpendicular to each other.

10. An optical amplifier according to claim 6 wherein the cross-sectional shape is octagonal.

11. A method of forming an optical fiber comprising:
   providing a core through which optical energy travels in a longitudinal direction, the core having a first refractive index;
   surrounding the core with an inner cladding having a second refractive index lower than the first refractive index, the inner cladding having a noncircular cross-sectional shape in a plane perpendicular to the longitudinal direction, the shape being such that two perpendicular distances across the shape, each of which passes through a geometric center of the core, are equal for all angular positions; and
   surrounding the inner cladding with an outer cladding.

12. A method according to claim 11 wherein surrounding the core with an inner cladding includes providing said cross-sectional shape with two flat surfaces, a first of which is colinear with a first line and a second of which is colinear with a second line that is perpendicular to the first line.

13. A method according to claim 12 wherein surrounding the core with an inner cladding includes providing said cross-sectional shape with four flat surfaces separated by other surfaces of the shape, two of the four flat surfaces being parallel to the first line and two being parallel to the second line.

14. A method according to claim 13 wherein the first line and the second line are perpendicular to each other.

15. A method according to claim 11 wherein the cross-sectional shape is octagonal.

16. A method of amplifying a first optical signal having a first wavelength, the method comprising:

coupling the first optical signal into an optical fiber comprising:
- a core through which the first optical signal travels in a longitudinal direction, the core having a first refractive index and being doped with an active element such that it absorbs light in a second wavelength band and outputs light in the first wavelength band in response thereto;
- an inner cladding surrounding the core and having a second refractive index lower than the first refractive index, the inner cladding having a noncircular cross-sectional shape in a plane perpendicular to the longitudinal direction, the shape being such that two perpendicular distances across the shape, each of which passes through a geometric center of the core, are equal for all angular positions; and
- an outer cladding surrounding the inner cladding; and coupling an optical pumping signal in the second wavelength band into the inner cladding of the fiber.

17. A method according to claim 16 further comprising providing the cross-sectional shape with two flat surfaces, a first of which is colinear with a first line and a second of which is colinear with a second line that is perpendicular to the first line.

18. A method according to claim 17 wherein the flat surfaces are provided by milling the inner cladding layer of a preform of the fiber.

19. A method according to claim 16 further comprising providing the cross-sectional shape with four flat surfaces separated by other surfaces of the shape, wherein two of the four flat surfaces are parallel to a first line and two are parallel to a second line.

20. A method according to claim 19 wherein the flat surfaces are provided by milling the inner cladding layer of a preform of the fiber.

21. A method according to claim 19 wherein the first line and the second line are perpendicular to each other.

22. A method according to claim 16 further comprising providing said cross-sectional shape such that it is octagonal.

* * * * *